United States Patent [19]

Collins, Jr. et al.

[11] Patent Number: 5,493,213
[45] Date of Patent: Feb. 20, 1996

[54] BAR CODE SCANNER DIAGNOSTIC METHOD

[75] Inventors: Donald A. Collins, Jr., Duluth, Ga.; Andrew B. Nye, III, Lansing, N.Y.

[73] Assignee: AT&T Global Information Solutions Company, Dayton, Ohio

[21] Appl. No.: 221,209

[22] Filed: Mar. 30, 1994

[51] Int. Cl.$^6$ ................................................. G06F 11/00
[52] U.S. Cl. ........................ 324/158.1; 371/25.1; 235/438
[58] Field of Search ................................. 324/158.1, 72.5, 324/73.1; 371/25.1; 235/481, 462

[56] References Cited

U.S. PATENT DOCUMENTS

| | | | |
|---|---|---|---|
| 3,780,271 | 12/1973 | Sharkitt et al. | 235/61.11 E |
| 3,786,431 | 1/1974 | Bouchet et al. | 340/172.5 |
| 3,949,363 | 4/1976 | Holm | 340/146.3 D |
| 4,718,064 | 1/1988 | Edwards et al. | 371/20 |
| 4,742,521 | 5/1988 | Nishida | 371/54 |
| 4,760,330 | 7/1988 | Lias, Jr. | 324/73 R |
| 4,939,353 | 7/1990 | Iijima | 235/438 |
| 5,140,145 | 8/1992 | Bianco | 235/462 |
| 5,243,602 | 9/1993 | Akagi, Jr. | 371/25.1 |

*Primary Examiner*—Kenneth A. Wieder
*Assistant Examiner*—Barry C. Bowser
*Attorney, Agent, or Firm*—Paul W. Martin

[57] ABSTRACT

A bar code scanner diagnostic method which may be performed at a retail site or during the burn-in phase of manufacturing. The method includes the steps of applying power to the scanner, reading a bar code label by the scanner, determining whether the bar code label is a diagnostic bar code label, reading the diagnostic bar code label by the scanner a first predetermined number of times within a predetermined period of time if the bar code label is the diagnostic bar code label, determining scanner failures which occurred during the reading of the diagnostic bar code label, logging the failures which occurred during reading of the diagnostic bar code label, cycling power to the scanner after the predetermined time period, and performing the reading through cycling steps a second predetermined number of times. Logged failures may be downloaded to a terminal coupled to the scanner and printed by a printer coupled to the terminal.

21 Claims, 2 Drawing Sheets

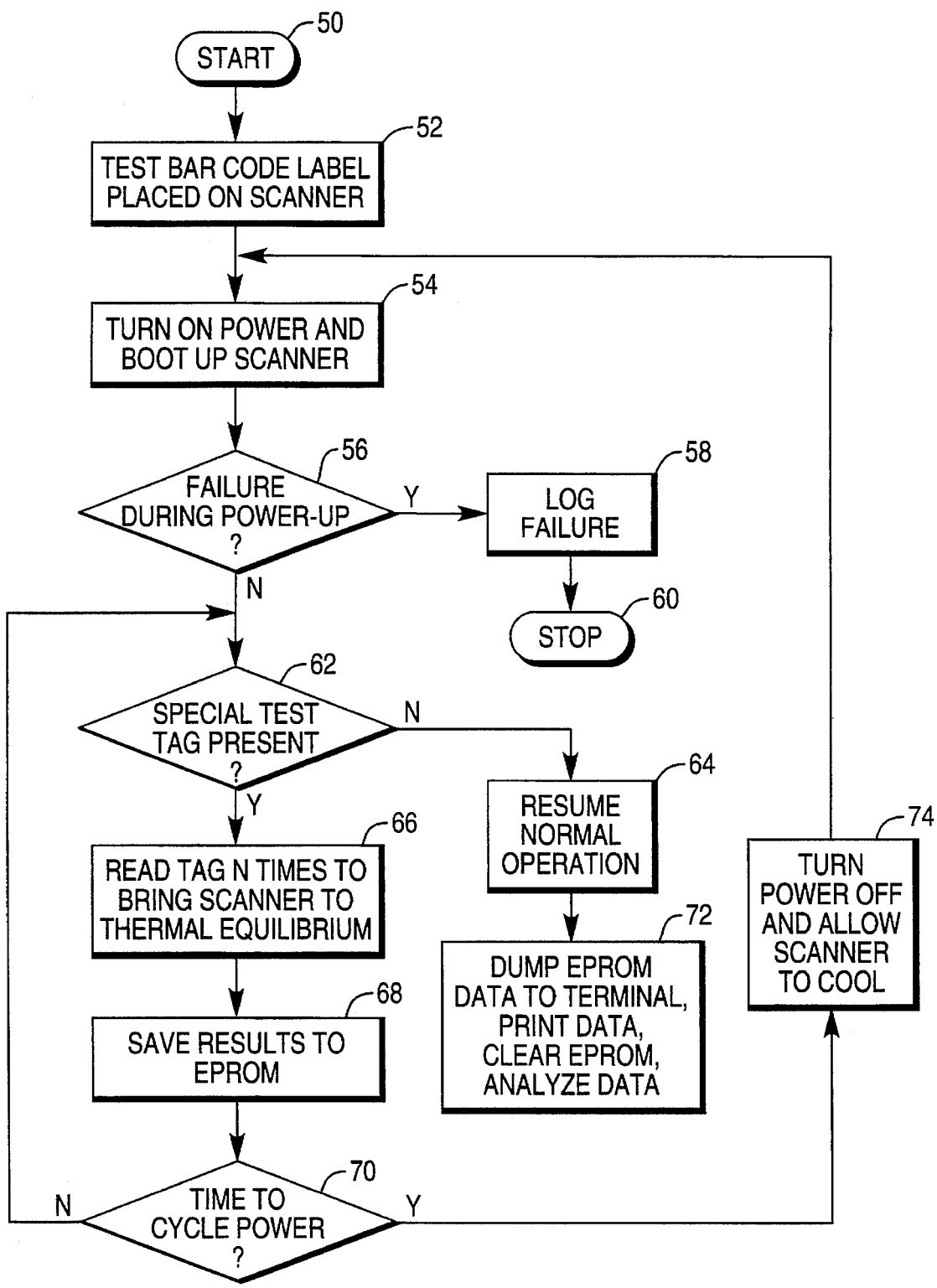

BAR CODE SCANNER DIAGNOSTIC METHOD

BACKGROUND OF THE INVENTION

The present invention relates to optical bar code scanners and more specifically to a bar code scanner diagnostic method.

Optical scanners are well known for their usefulness in retail checkout and inventory control. Optical scanners generally employ a laser diode, the light from which is focused and collimated to produce a scanning beam. A motor-driven mirrored spinner directs the beam against a plurality of stationary mirrors, and directs the reflected light from the bar code label to a detector. The pattern produced by such a scanner is characterized by lines oriented at various angles to one another.

During manufacturing, a scanner is tested to ensure that it shuts off when power is removed and turns on when power is applied. Scanner performance data is typically not taken during manufacturing and, therefore, is not available for comparison and analysis when the scanner fails in the field.

Routine scanner diagnostic tests are implemented during each application of power to the scanner and during each attempted scan of a bar code label. The power-on diagnostic check tests the firmware and determines whether power is available to the motor and laser. The check during each scan is a check performed by the scanner operator who merely determines whether the scanner was able to read a bar code label based upon a visual or aural indication.

After a scanner failure, a common diagnostic test of the scanner after a scanner failure includes the steps of positioning a tag having a bar code label printed thereon over a scan line and providing audible feedback to the diagnostic technician if the tag is successfully read. Such a test is imprecise and the results are open to subjective judgment. It cannot be reliably used to diagnose problems in which the power-on diagnostic program reports a "no-fault" operation condition or intermittent problems caused by tolerance errors, failing parts, or the scanning environment.

Therefore, it would be desirable to provide a reliable bar code scanner diagnostic method, especially for diagnosing scanner failures in the field.

Summary of the Invention

In accordance with the teachings of the present invention, a bar code scanner diagnostic method is provided. The method includes the steps of applying power to the scanner, reading a bar code label by the scanner, determining whether the bar code label is a diagnostic bar code label, reading the diagnostic bar code label by the scanner a first predetermined number of times within a predetermined period of time if the bar code label is the diagnostic bar code label, determining scanner failures which occurred during the reading of the diagnostic bar code label, logging the failures which occurred during reading of the diagnostic bar code label, cycling power to the scanner after the predetermined time period, and performing the first reading step through the cycling step a second predetermined number of times. Logged failures may be downloaded to a terminal coupled to the scanner and printed by a printer coupled to the terminal.

It is a feature of the present invention that the method may be performed at a retail site or during the burn-in phase of manufacturing. When performed during manufacturing, the method significantly reduces test and burn-in times.

It is accordingly an object of the present invention to provide a bar code scanner diagnostic method.

It is another object of the present invention to provide a bar code scanner diagnostic method which reduces the test and burn-in time of a scanner during manufacturing.

It is another object of the present invention to provide a bar code scanner diagnostic method which may be used during manufacturing or after a scanner has failed in the field.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the bar code scanner diagnostic method of the present invention.

DETAILED DESCRIPTION OF THE PREFERRED EMBODIMENT

Figure 1:
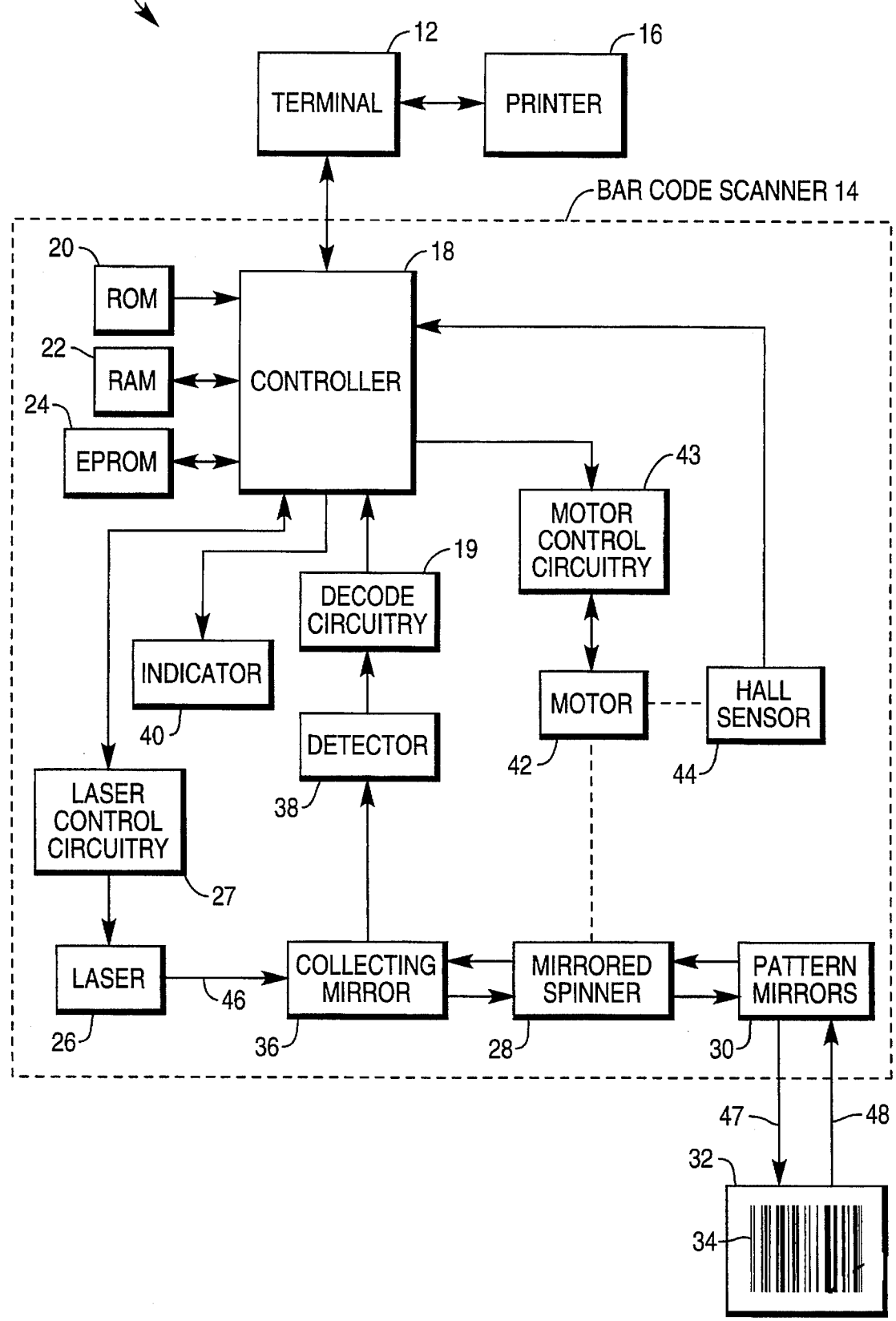
FIG. 1 is a block diagram of a retail system including an optical bar code scanner.

Referring now to FIG. 1, retail system includes terminal 12 and bar code scanner 14.

Terminal 12 preferably includes printer 16 for printing diagnostic data. Terminal 12 may be a retail terminal adjacent scanner 14, or a diagnostic terminal brought by service personnel.

Bar code scanner 14 includes electronic components such as controller 18, bar code label decode circuitry 19, read-only-memory (ROM) 20, random-access-memory (RAM) 22, erasable-programmable read-only-memory (EPROM) 24, laser control circuitry 27, and motor control circuitry 43.

Controller 18 controls operation of scanner 14, monitors scanner components for failures, and determines the likely cause of the failures (see Table I below). Controller 18 generates signals which produce a number of audible beeps and/or flashing lights corresponding to malfunctions listed in the right side of Table I.

Bar code label decode circuitry 19 contains firmware instructions for decoding bar code label 34, passing the decoded information to controller 18, and indicating to controller 18 whether bar code label decode circuitry was able to read the bar code label 34. Decoding failures are reported to an operator through indicator 40, which preferably includes red and green lights and aural beeps.

Bar code label 34 may be a product bar code label or a diagnostic bar code label. A diagnostic bar code label may have special delineating lines or other predetermined indicia which differentiate it from product bar code labels. When bar code label 34 is a diagnostic bar code label, scanner 14 enters a diagnostic mode. A discussion of programming bar code labels can be found in commonly-assigned U.S. Pat. No. 4,868,375 entitled "Method For Changing The Functions Of A Bar Code Reader", issued Sep. 19, 1989, to Blanford. This patent is hereby incorporated by reference.

ROM 20 provides code instructions necessary for scanner to boot-up.

RAM 22 provides operating memory for controller 18.

EPROM 24 stores failure information during testing.

Laser control circuitry 27 controls operation of laser 26 in response to control signals from controller 18.

Motor control circuitry 43 controls operation of motor 42 in response to control signals from controller 18.

Scanner 14 also includes laser 26, mirrored spinner 28, pattern mirrors 30, collecting mirror 36, detector 38, and indicator 40.

Laser 26 is preferably a laser diode. The beam 46 from laser 26 is reflected by mirrored spinner 28 towards pattern mirrors 30.

Mirrored spinner 28 generates scan lines 47. Mirrored spinner 28 is preferably a polygon member having a plurality of reflective facets. Mirrored spinner 28 is rotated by motor 42. Hall sensor 44 provides controller 18 information about the operability of motor 42.

Pattern mirrors 30 reflect scan lines 47 at item 32 having bar code label 34. Light 48 reflected from item 32 is directed by pattern mirrors 30 to mirrored spinner 28 and on to collecting mirror 36.

Collecting mirror 36 directs reflected light 48 at detector 38.

Detector 38 converts reflected light 48 in to electrical signals based upon the intensity of reflected light 48.

Turning now to FIG. 2, the scanner diagnostic method of the present invention begins at START 50.

In step 52, a tag having a diagnostic bar code label printed thereon is placed over scanner 14.

In step 54, power is turned on and scanner 14 is booted up.

In step 56, the method determines whether laser 26, laser control circuitry 27, motor 42, or motor control circuitry 43 failed during boot-up. If so, then the failure is logged in EPROM 24 by controller 18 in step 58 and the method stops in step 60.

If scanner 14 boots up without a failure, then the method verifies that diagnostic bar code label is on top of scanner 14 in step 62. If diagnostic bar code label has been removed and a product bar code label has been scanned, then the method proceeds to step 64, in which normal product scanning operation is resumed.

As long as the diagnostic bar code label is present, the method proceeds to step 66, in which the diagnostic bar code label is read a number of times N, where N is a number sufficient to bring scanner 14 to thermal equilibrium. A number N of about 300 is satisfactory.

Scanner 14 reads the diagnostic bar code label for about one revolution of motor 42. Decode circuitry 19 decodes the diagnostic bar code label and passes failure information after each read to controller 18.

In step 68, controller 18 logs all read failures and executed power cycles (step 58) and generates signals which produce a number of audible beeps and/or flashing lights corresponding to malfunctions listed in the right side of Table I below:

TABLE I

| Number of Audible Beeps and Red Flashing Lights | Failure Symptoms |
| --- | --- |
| 2 | RAM chip failure |
| 3 | Motor Good signal is enabled during power down |
| 4 | Motor Good signal is not enabled after power up |
| 5 | Bad Hall Effect sensor or motor speed too slow |
| 6 | Bad EPROM |
| 7 | Laser power delay did |

TABLE I-continued

| Number of Audible Beeps and Red Flashing Lights | Failure Symptoms |
| --- | --- |
| | not drop out |
| 8 | Laser did not turn off |
| 10 | Label read circuit failure |
| 11 | Laser did not turn on |
| 12 | ROM checksum failure |

In step 70, the method determines whether it is time to cycle power on and off to scanner 14 by comparing test time to a predetermined time, where the predetermined time is long enough to allow scanner 14 to reach thermal equilibrium. A typical value for the predetermined time is fifteen minutes. If the test time is less than the predetermined time, the method returns to step 62 through step 58 to continue reading the diagnostic bar code label.

If the test time is greater than or equal to the predetermined time, then the method returns to step 56 to cycle power on and off and begin a new test. Power is turned off long enough to allow scanner 14 to cool to ambient temperature before power is turned on again. These rapid temperature changes are designed to stress scanner 14. A typical test may cycle power four times an hour.

The method continues until the test tag is removed, signaling the method to resume normal operation in step 64.

In step 72, data stored in EPROM 24 is dumped to terminal 12 and evaluated by service personnel. The data may be printed by printer 16. EPROM 24 is cleared to make ready for the next test.

Advantageously, the method of FIG. 2 may be performed at a retail site or during the burn-in phase of manufacturing. When performed during manufacturing, the test and burn-in phases are combined and the combined phase is significantly shorter than previous test and burn-in phases combined.

Although the present invention has been described with particular reference to certain preferred embodiments thereof, variations and modifications of the present invention can be effected within the spirit and scope of the following claims.

What is claimed is:

1. A method of diagnosing a failure of a component within a bar code scanner comprising the steps of:

(a) applying power to the scanner;

(b) reading a diagnostic bar code label which places the scanner in a diagnostic mode of operation by the scanner a first predetermined number of times within a predetermined period of time;

(c) determining that the component has failed during step (b);

(d) logging the failure;

(e) cycling power to the scanner after the predetermined time period to stress the scanner; and (f) performing steps (b), (c), and (d) a second predetermined number of times.

2. The method as recited in claim 1, further comprising the step of:

(g) downloading the logged failure to a terminal coupled to the scanner.

3. The method as recited in claim 2, further comprising the step of:

(h) printing the logged failure by a printer coupled to the terminal.

4. The method as recited in claim 1, further comprising the steps of:

(g) determining additional component failures which occurred during step (a); and (h) logging the scanner additional component failures which occurred during step (a).

5. The method as recited in claim 1, wherein step (a) comprises the substeps of:

(a-1) booting up the scanner; and (a-2) performing a self-test program by a controller within the scanner.

6. The method as recited in claim 1, wherein step (b) comprises the substeps of:

(b-1) reading a bar code label by the scanner;

(b-2) determining whether the bar code label is the diagnostic bar code label; and (b-3) resuming normal scanner operation if the bar code label is not the diagnostic bar code label.

7. The method as recited in claim 1, wherein step (b) comprises the substep of:

(b-1) reading the diagnostic bar code label for one revolution of a motor within the scanner.

8. The method as recited in claim 1, wherein step (d) comprises the substep of:

(d-1) storing component failure in an EPROM coupled to a controller within the scanner.

9. The method as recited in claim 1, wherein step (e) comprises the substep of:

(e-1) cycling power after a time period of fifteen minutes.

10. The method as recited in claim 1, wherein step (c) comprises the substep of:

(c-1) determining the failure of a Hall Effect sensor for monitoring the operability of a motor within the scanner by a controller within the scanner.

11. The method as recited in claim 1, wherein step (c) comprises the substep of:

(c-1) determining the failure of a motor control circuit within the scanner by a controller within the scanner.

12. The method as recited in claim 1, wherein step (c) comprises the substep of:

(c-1) determining the failure of a laser control circuit within the scanner by a controller within the scanner.

13. The method as recited in claim 1, wherein step (c) comprises the substep of:

(c-1) determining the failure of a RAM chip within the scanner by a controller within the scanner.

14. The method as recited in claim 1, wherein step (c) comprises the substep of:

(c-1) determining the failure of a motor within the scanner by a controller within the scanner.

15. The method as recited in claim 1, wherein step (c) comprises the substep of:

(c-1) determining the failure of a laser within the scanner by a controller within the scanner.

16. The method as recited in claim 1, wherein step (c) comprises the substep of:

(c-1) determining the failure of a bar code decoding circuit within the scanner by a controller within the scanner.

17. The method as recited in claim 1, wherein step (c) comprises the substep of:

(c-1) determining the failure of a ROM chip within the scanner by a controller within the scanner.

18. The method as recited in claim 1, wherein the first predetermined number is three hundred.

19. The method as recited in claim 1, wherein the method is performed during manufacturing of the scanner.

20. The method as recited in claim 1, wherein the method is performed after the scanner has failed in the field.

21. A method of diagnosing a failure of a component within a bar code scanner comprising the steps of:

(a) applying power to the scanner;

(b) reading a bar code label by the scanner;

(c) determining whether the bar code label is a diagnostic bar code label which places the scanner in a diagnostic mode of operation;

(d) if the bar code label is the diagnostic bar code label, reading the diagnostic bar code label by the scanner a first predetermined number of times within a predetermined period of time;

(e) determining that the component has failed during step (d);

(f) logging the failure which occurred during step (d);

(g) cycling power to the scanner after the predetermined time period to stress the scanner;

(h) performing steps (b) through (g) a second predetermined number of times to determine additional component failures;

(i) downloading the logged failures to a terminal coupled to the scanner; and (j) printing the logged failures by a printer coupled to the terminal.

* * * * *